Figure 1:
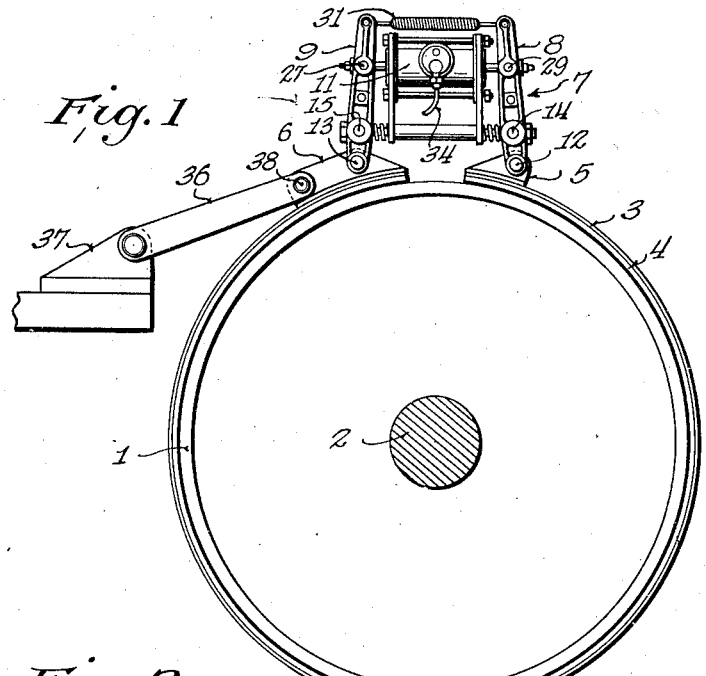

March 3, 1942.  J. D. HALE  2,275,142

FRICTION BAND ACTUATOR

Filed Feb. 3, 1940

INVENTOR.
John D. Hale
BY Louis Quarles
ATTORNEY.

Patented Mar. 3, 1942

2,275,142

UNITED STATES PATENT OFFICE 2,275,142

FRICTION BAND ACTUATOR

John D. Hale, Milwaukee, Wis., assignor to Harnischfeger Corporation, Milwaukee, Wis., a corporation of Wisconsin Application February 3, 1940, Serial No. 317,077

9 Claims. (Cl. 188—152)

This invention relates to apparatus for actuating brake and clutch bands and like friction members and resides in a novel actuating apparatus supported entirely by the friction band to which it is applied, to the end that floating anchorage of the band may be employed so that contraction or expansion of said band may be effected in a smooth, uniform manner independently of moderate dimensional inaccuracies in the drum against which said band is arranged to act.

Heretofore in the art a wide variety of forms of actuators have been employed for causing the expansion or contraction of friction bands employed in clutches, brakes, and the like. In all of these some form of radially fixed base or fulcrum has been employed, with the result that smooth and uniform application of friction pressure has been dependent to a substantial extent upon the true roundness and concentricity of the drum against which the friction band acts. In practice, in such arrangements, it has not been feasible to produce drums of sufficient precision to make possible complete smoothness and uniformity of application of friction pressure throughout the periphery of the drum. As a result, unequal and unnecessary wear of the friction linings employed has been experienced. On the other hand, through this invention a friction band may be caused to engage a drum in a manner which is little, if any, influenced by moderate eccentricity and lack of roundness in the drum and, furthermore, to engage a drum in a manner which permits a floating anchorage of the friction band which practically eliminates unequal loading of the friction band due to moderate dimensional inaccuracies in the drum.

This invention is herein described with the aid of the accompanying drawing which forms a part hereof and in which there is set forth, by way of illustration and not of limitation, one form in which the apparatus of this invention may be embodied.

Figure 2:
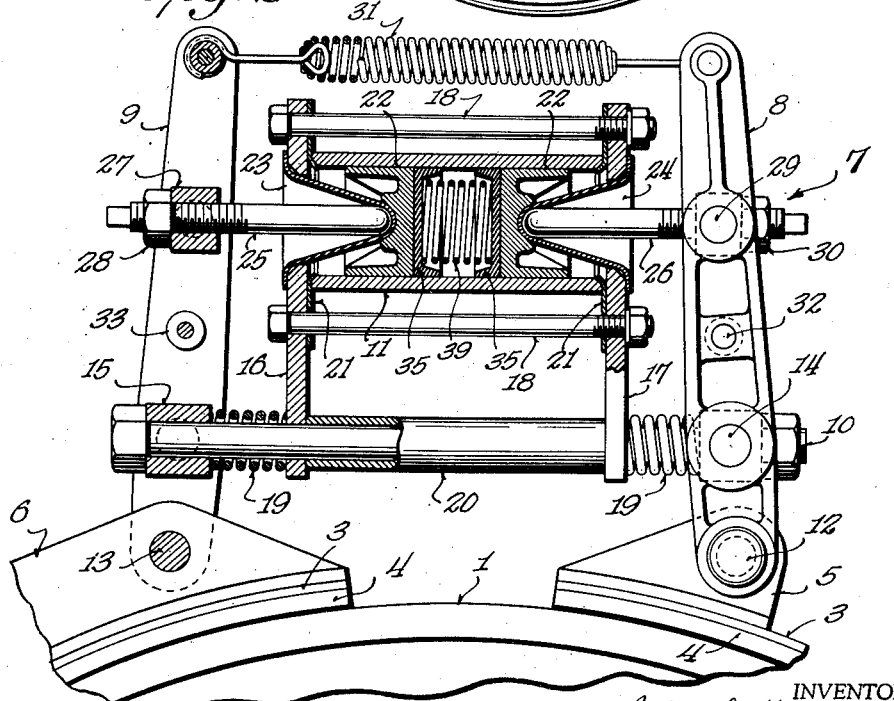

In the drawing:

Fig. 1 is an end elevation showing one form of the apparatus of this invention; and Fig. 2 is an end elevation, partly in section, showing in detail the actuator portion of the apparatus shown in Fig. 1.

The form of the apparatus of this invention shown in the drawing is embodied in an external contracting friction band brake, adapted to act against a brake drum 1, as shown. The drum 1 is conventional in form and is mounted to turn upon the shaft 2. Surrounding practically the entire periphery of drum 1 is an external contracting band 3 provided with friction lining 4. A terminal lug 5 is attached to one end of the band 3 and a terminal lug 6 to the opposite end. The terminal lugs 5 and 6 are caused to act toward one another by the actuating apparatus proper shown more in detail in Fig. 2.

The actuating apparatus proper is designated generally by the numeral 7 and is made up of oppositely disposed pairs of rocker arms 8 and 9 fulcrumed on an adjusting bolt 10 and controlled by hydraulic cylinder 11. The pair of rocker arms 8 straddles terminal lug 5 and is pin-connected thereto by pin 12, which passes through a hole provided therein. In similar manner the pair of rocker arms 9 is pin-connected by means of pin 13 to terminal lug 6. The fulcrum action of adjusting bolt 10 is obtained by a slip-fit engagement with holes in trunnion blocks 14 and 15, which make pivotal connection with rocker arm pairs 8 and 9 respectively, as shown.

Support for the cylinder 11 is furnished by end plates 16 and 17 which are mounted to slide freely upon the adjusting bolt 10, the end plates 16 and 17 being securely clamped to the cylinder 11 by means of through-bolts 18. In order to insure approximate centering of the cylinder 11, spacer springs 19 are inserted between the trunnion block 15 and the end plate 16 on the one hand and between the trunnion block 14 and the end plate 17 on the other. A spacer sleeve 20 adds to the rigidity of the cylinder support and flanged seats 21 insure proper centering of the cylinder 11 with reference to the end plates 16 and 17.

Contained within the cylinder 11 is a pair of outwardly acting opposed pistons 22 provided with cup-washers 35 which are held and guided by the spring 39. The pistons 22 are arranged to act through cone sockets 23 and 24 against push-rods 25 and 26. The push-rod 25 is threaded to engage a tapped hole in a trunnion block 27 and is provided with a locknut 28 which permits the locking of push-rod 25 in rigid relationship to the trunnion block 27. The trunnion block 27 in turn is pivotally received in the bearings provided therein in the pair of rocker arms 9. In similar manner the push-rod 26 makes threaded engagement with trunnion block 29 with reference to which it may be locked by locknut 30. A square end is provided on each of the push-rods 25 and 26 to facilitate initial adjustment and locking of the push-rods with reference to their respective trunnion blocks.

A retracting spring 31 is mounted upon the upper ends of the rocker arm pairs 8 and 9 in the position shown upon cross-pins provided for that purpose. The respective members which make up the rocker arm pairs 8 and 9 are held together in spaced relation by spacer rivets 32 and 33, as shown.

Hydraulic fluid for causing the pistons 22 to act is supplied through flexible hydraulic conduit 34, shown clearly in Fig. 1. Hydraulic fluid thus supplied under pressure enters cylinder 11 where it acts against the pistons 22, causing the same to act outwardly, thus causing the terminal lugs 5 and 6 to act toward one another to apply friction pressure to the drum 1. It will be apparent that this action will take place without the aid of a fulcrum radially fixed with reference to the drum 1.

In order to prevent the turning of the friction band 3 with the drum 1, the band 3 is anchored by means of floating link 36 and fixed anchorage 37. By so anchoring the band 3 tangential forces set up therein are effectively resisted at the same time permitting substantial radial displacement of floating anchorage pin 36, due to eccentricity or lack of roundness in the drum 1. While floating link 36 has been shown as being attached to the terminal lug 6 close to the actuating apparatus 7, such position of anchorage is not essential, since the band 3 will function if anchored at any point in its periphery.

In the event of wear in the lining 4 the apparatus may be adjusted to compensate therefor by turning the nut provided on adjusting bolt 10, thus reducing the distance between trunnion blocks 14 and 15. In so adjusting the apparatus of this invention the equal opposed action of the pistons 22 is not impaired and no secondary adjustment need be made, thus reducing the matter of adjustment to a single, easily accomplished operation. The effectiveness of this single adjustment is to a large extent facilitated by the nonrigid mounting of cylinder 11, which is kept in an approximately centered position by the centering springs 19. By so mounting the cylinder 11 equalized action of the pistons 22 is retained over a wide range of adjustment and no parts requiring a high degree of precision need be employed to render the single adjustment effective. Furthermore, the novel independent mounting of the opposed pistons 22 eliminates the possibility of undesirable friction due to any misalignment which may be introduced by the adjusting movement. Complete independence of action of the opposed pistons 22 is assisted by the cone sockets 23 and 24, which tend to correct unequal positioning of the pistons each time the brake is released. Furthermore, the cone sockets 23 and 24 completely prevent closing off of the entrance port through which condit 34 enters the cylinder 11 by reason of an unequal positioning of pistons 22.

While this invention has been herein described by reference to a specific embodiment thereof, it is intended that the protection of letters patent to be granted hereon be not unnecessarily restricted thereby but extend to the limits of the inventive advance disclosed herein as set forth in the claims hereto appended.

That which I claim as my invention is:

1. In a friction apparatus, the combination comprising a rotatable drum, a friction band engageable therewith, a hydraulic cylinder mounted on said band capable of radial movement therewith and having a piston for causing engagement of said band with said drum, a flexible hydraulic conduit for supplying hydraulic fluid under pressure to said cylinder to cause engagement of said band with said drum, and means capable of radial movement with said band for resisting tangential forces in said band.

2. In a fluid-controlled external contracting friction apparatus, a rotatable drum, an open-ended contractable external friction band surrounding said drum, rocker members connected to the ends of said band, fulcrum means joining said rocker members by pivotal connection therewith, fluid-actuated means for causing said rocker members to exert a closing force upon the ends of said band, radially displaceable means for supplying actuating fluid to said fluid-actuated means, and means capable of radial movement with said band for resisting tangential force therein.

3. In a hydraulically-controlled external contracting friction apparatus, a rotatable drum, an open-ended contractible external friction band surrounding said drum, rocker members connected to the ends of said band, fulcrum means pivotally joining medial points of said rocker members, expansible hydraulic means positioned between said rocker members beyond said fulcrum means for causing said rocker members to exert a closing force upon the ends of said band, radially displaceable means for supplying actuating fluid to said expansible hydraulic means, and means capable of radial displacement with said band for resisting tangential force therein.

4. A hydraulic actuator for friction apparatus comprising two rocker members engageable with the ends of a friction band for controlling the same, being positioned side by side in roughly parallel relation, an adjustable bolt pivotally joining medial points of said rocker members, a hydraulic cylinder positioned between the free ends of said rockers having a sliding mounting carried by said bolt, centering springs between said sliding mounting and said rocker members, a piston in said cylinder arranged to act against the free end of one of said rockers, and means for communicating the reaction of hydraulic forces exerted by said piston to the other rocker member.

5. A hydraulic actuator for friction apparatus comprising two rocker members engageable with the ends of a friction band for controlling the same, being positioned side by side in roughly parallel relation, an adjustable bolt pivotally joining medial points of said rocker members, an open-ended hydraulic cylinder positioned between the free ends of said rocker members having a sliding mounting carried by said bolt, centering springs on each side of said cylinder mounting between said cylinder mounting and said rocker members, a pair of outwardly acting pistons in said cylinder, push-rods connecting one of said pistons to each of said rocker members, a releasing spring for biasing the free ends of said rocker members and said pistons toward one another, and means engaging stops exterior to said cylinder for limiting inward movement of said pistons.

6. A hydraulic actuator for friction apparatus comprising two rocker members engageable with the ends of a friction band for controlling the same, a fulcruming link pivotally joining said rockers, a hydraulic cylinder mounted upon said fulcruming link and movable with respect thereto, a piston in said cylinder connected to one of said links to act thereon, and means for communicating the reaction of hydraulic forces exerted by said piston to the other rocker member.

7. A hydraulic actuator for friction apparatus comprising a rocker member engageable with one end of an open ended friction band for controlling the same, a fulcruming link pivotally joining said rocker with the other end of said band, a hydraulic cylinder mounted on said fulcruming link and movable with respect thereto, a piston in said cylinder connected to said link to act thereon, and means for communicating the reaction of hydraulic forces exerted by said piston to the other rocker member.

8. A hydraulic actuator for friction apparatus comprising two rocker members engageable with the ends of a friction band for controlling the same, a fulcruming link pivotally joining said rockers, a hydraulic cylinder mounted on said fulcruming link and movable with respect thereto, a pair of outwardly-acting pistons in said cylinder, and means for connecting one of said pistons to each of said rocker members.

9. A hydraulic actuator for friction apparatus comprising a rocker member engageable with one end of an open-ended friction band for controlling the same, a fulcruming link pivotally joining said rocker to the other end of said band, a hydraulic cylinder mounted on said fulcruming link, movable means responsive to fluid pressure in said cylinder, and means for connecting said movable means to said rocker.

JOHN D. HALE.